United States Patent
Jung et al.

(10) Patent No.: US 10,855,101 B2
(45) Date of Patent: Dec. 1, 2020

(54) APPARATUS FOR HARVESTING ENERGY USING DUAL ENVIRONMENT ENERGY SOURCE AND METHOD THEREOF

(71) Applicant: INDUSTRY-ACADEMIC COOPERATION FOUNDATION, YONSEI UNIVERSITY, Seoul (KR)

(72) Inventors: Seong Ook Jung, Seoul (KR); Ki Ryong Kim, Seoul (KR); Dong Hoon Jung, Seoul (KR); Hong Keun Ahn, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 193 days.

(21) Appl. No.: 16/050,639

(22) Filed: Jul. 31, 2018

(65) Prior Publication Data
US 2019/0044368 A1    Feb. 7, 2019

(30) Foreign Application Priority Data
Aug. 1, 2017  (KR) .......................... 10-2017-0097840

(51) Int. Cl.
*H02J 7/00* (2006.01)
*H02J 7/34* (2006.01)
*G05F 1/67* (2006.01)

(52) U.S. Cl.
CPC ............... *H02J 7/345* (2013.01); *G05F 1/67* (2013.01)

(58) Field of Classification Search
CPC ...................................................... H02J 7/345
USPC ........................................................... 307/70
See application file for complete search history.

(56) References Cited

U.S. PATENT DOCUMENTS

| | | | |
|---|---|---|---|
| 7,834,483 B2 * | 11/2010 | Kearney-Fischer | .... H02S 40/44 307/115 |
| 8,368,290 B2 | 2/2013 | Kwon et al. | |
| 9,197,143 B1 * | 11/2015 | Townsend | ............... H02J 1/108 |
| 9,207,735 B2 * | 12/2015 | Khaitan | ................. G05B 15/02 |
| 9,991,715 B1 * | 6/2018 | Huang | ..................... H02J 3/382 |
| 2010/0244573 A1 * | 9/2010 | Karnick | ..................... H02J 7/34 307/80 |
| 2012/0032518 A1 * | 2/2012 | Huang | ..................... H02J 50/30 307/81 |

(Continued)

FOREIGN PATENT DOCUMENTS

| KR | 10-2016-0032395 A | 3/2016 |
|---|---|---|
| KR | 10-2016-0098850 A | 8/2016 |

OTHER PUBLICATIONS

Eun-Jung Yoon et al., "An Auto-Switching Energy Harvesting Circuit Using Vibration and Thermoelectric Energy", j.inst.Korean. electric.electron.eng., vol. 19, No. 2, pp. 210-218, Jun. 2015

*Primary Examiner* — Adi Amrany
(74) *Attorney, Agent, or Firm* — Sughrue Mion, PLLC

(57) ABSTRACT

An apparatus for harvesting energy includes an AC harvester having an AC harvesting capacitor and configured to extract power from an AC environment energy source, a DC harvester configured to extract power from a DC environment energy source, and a power transferrer configured to control a transfer path of power extracted from the DC harvester based on a magnitude of a voltage of the AC harvesting capacitor and a magnitude of a voltage applied from the DC harvester.

10 Claims, 8 Drawing Sheets

(56) References Cited

U.S. PATENT DOCUMENTS

| | | | |
|---|---|---|---|
| 2013/0162046 A1* | 6/2013 | Lu | H02J 1/102 |
| | | | 307/72 |
| 2013/0162234 A1* | 6/2013 | Chiu | H02M 3/1582 |
| | | | 323/282 |
| 2016/0153840 A1* | 6/2016 | Huang | G01K 7/01 |
| | | | 374/163 |
| 2016/0211742 A1* | 7/2016 | Mohammad | H02J 50/00 |
| 2017/0149423 A1* | 5/2017 | Huang | H03K 5/19 |
| 2017/0179715 A1* | 6/2017 | Huang | H02M 3/07 |
| 2017/0288415 A1* | 10/2017 | Vaidya | H02J 7/345 |
| 2018/0091094 A1* | 3/2018 | La Rosa | H03L 5/00 |
| 2018/0166900 A1* | 6/2018 | Shousha | H02J 7/04 |
| 2018/0198321 A1* | 7/2018 | Govindaraj | H01L 41/1136 |

* cited by examiner

【Fig. 1】
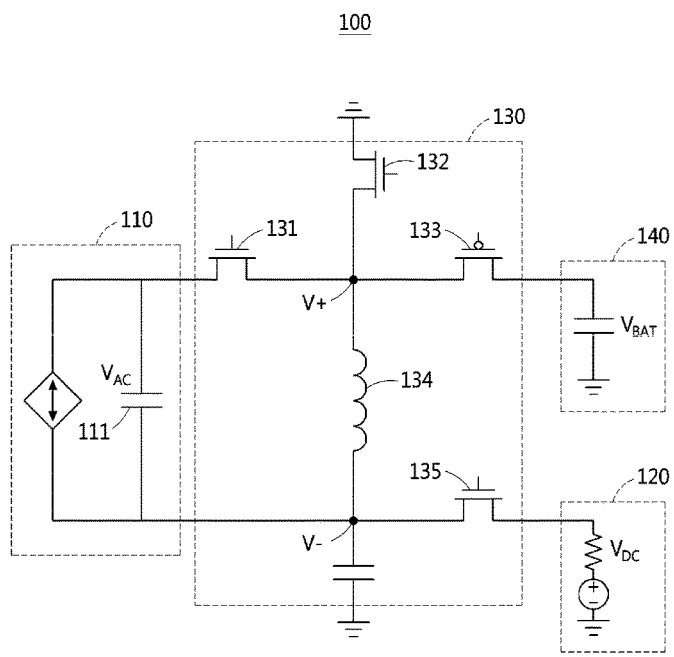
【Fig. 2】
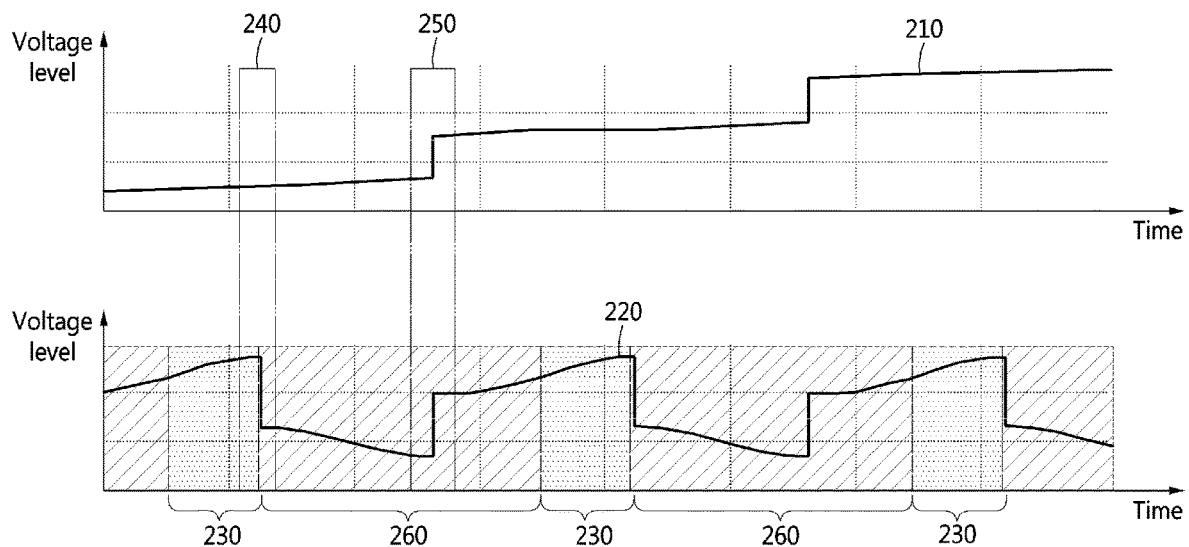

[Fig. 3A]
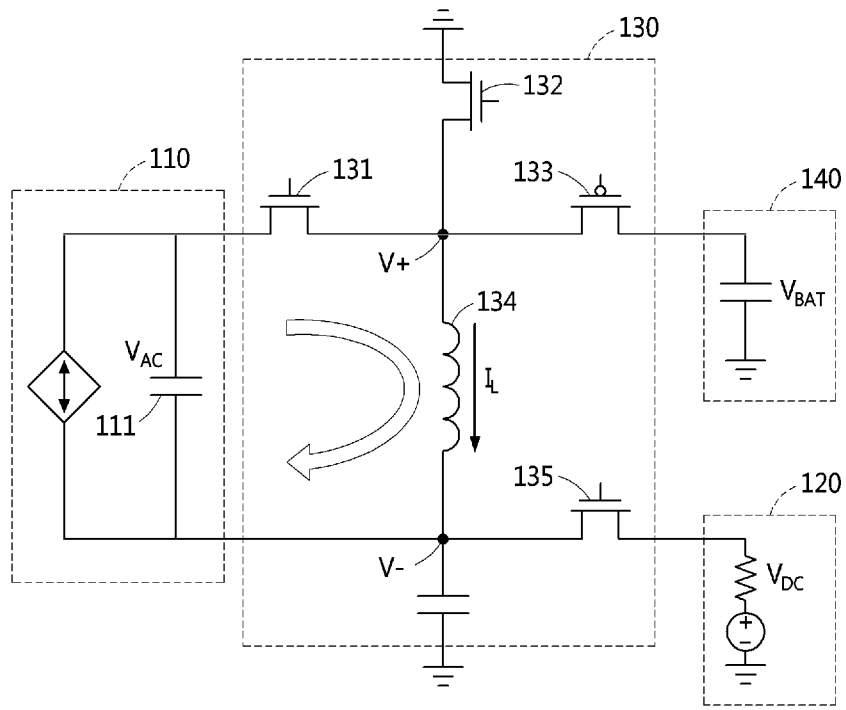
[Fig. 3B]
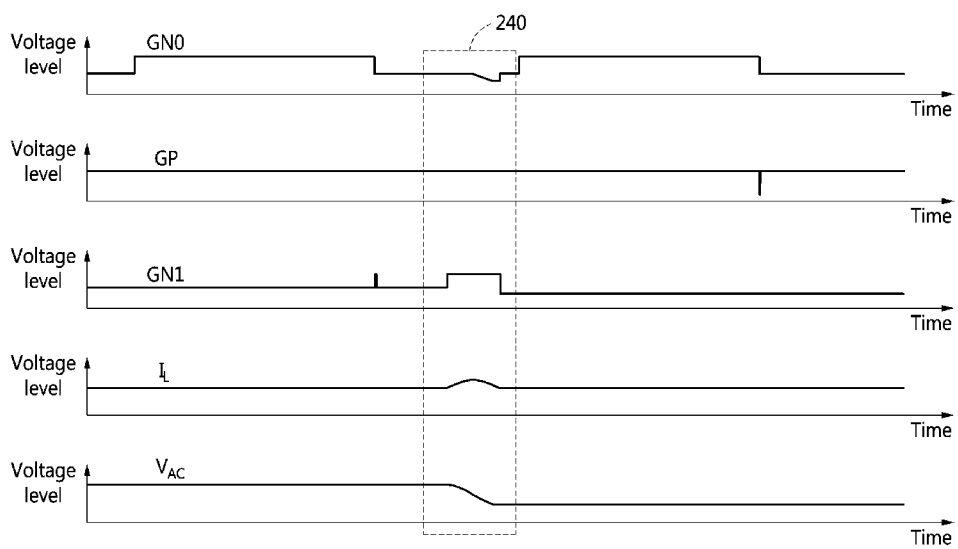

【Fig. 4A】
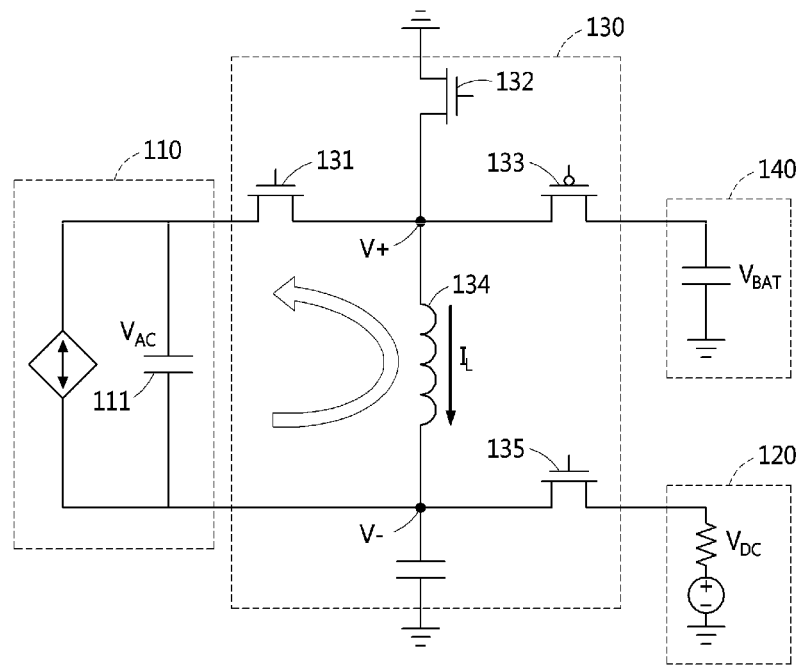
【Fig. 4B】
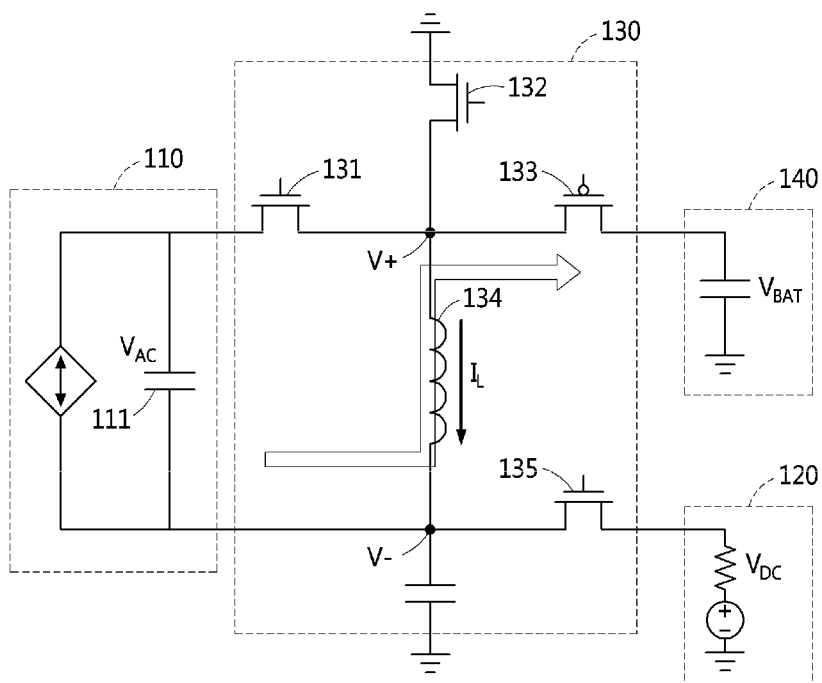

[Fig. 4C]
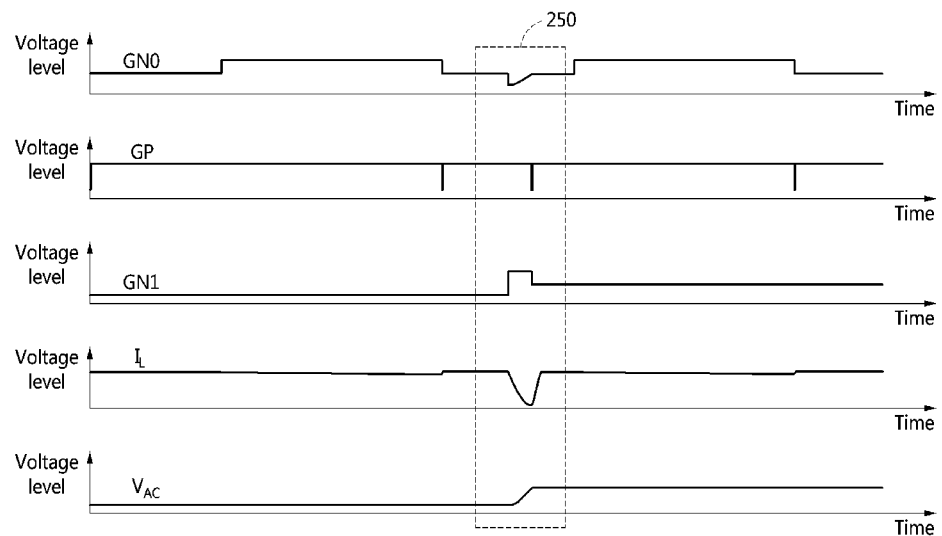
[Fig. 5A]
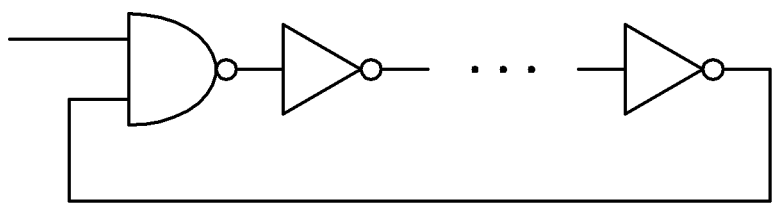

[Fig. 5B]
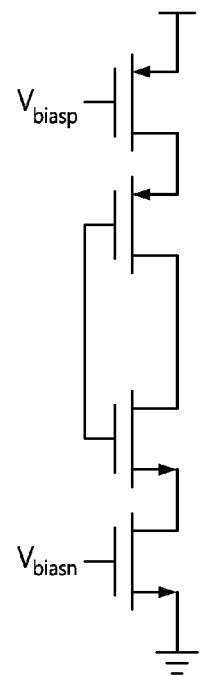
[Fig. 5C]
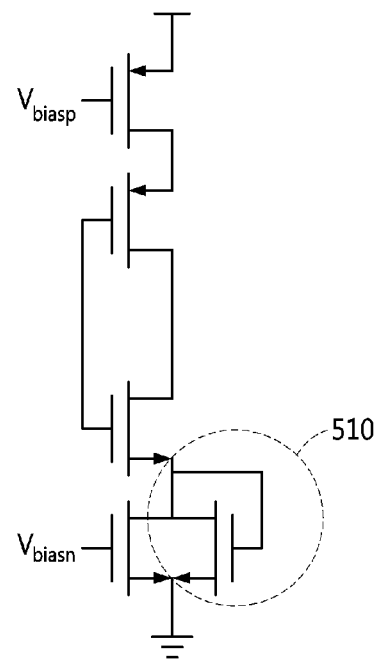

[Fig. 6A]
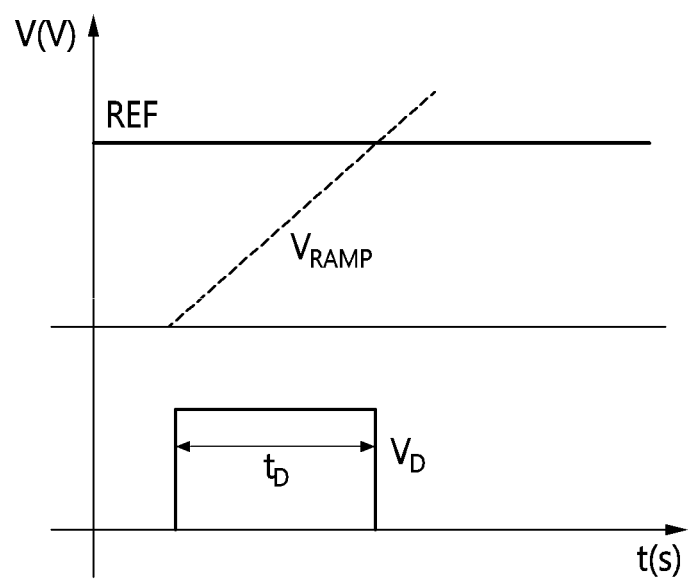
[Fig. 6B]
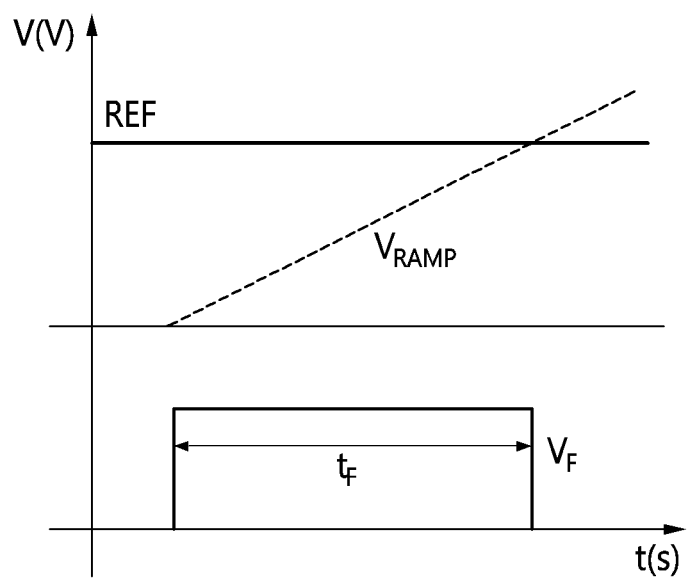

[Fig. 7A]
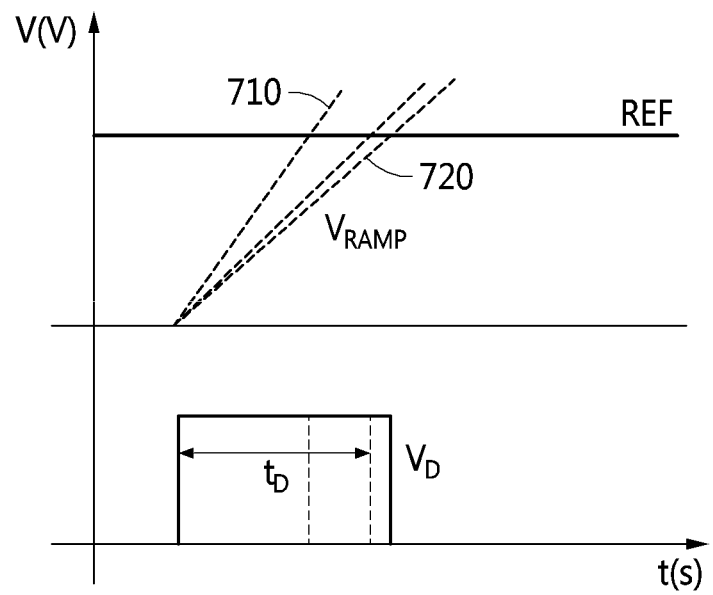
[Fig. 7B]
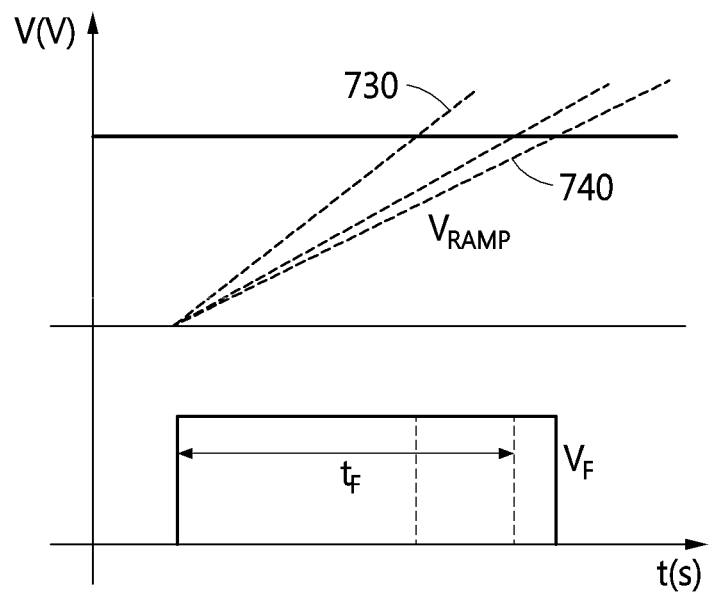

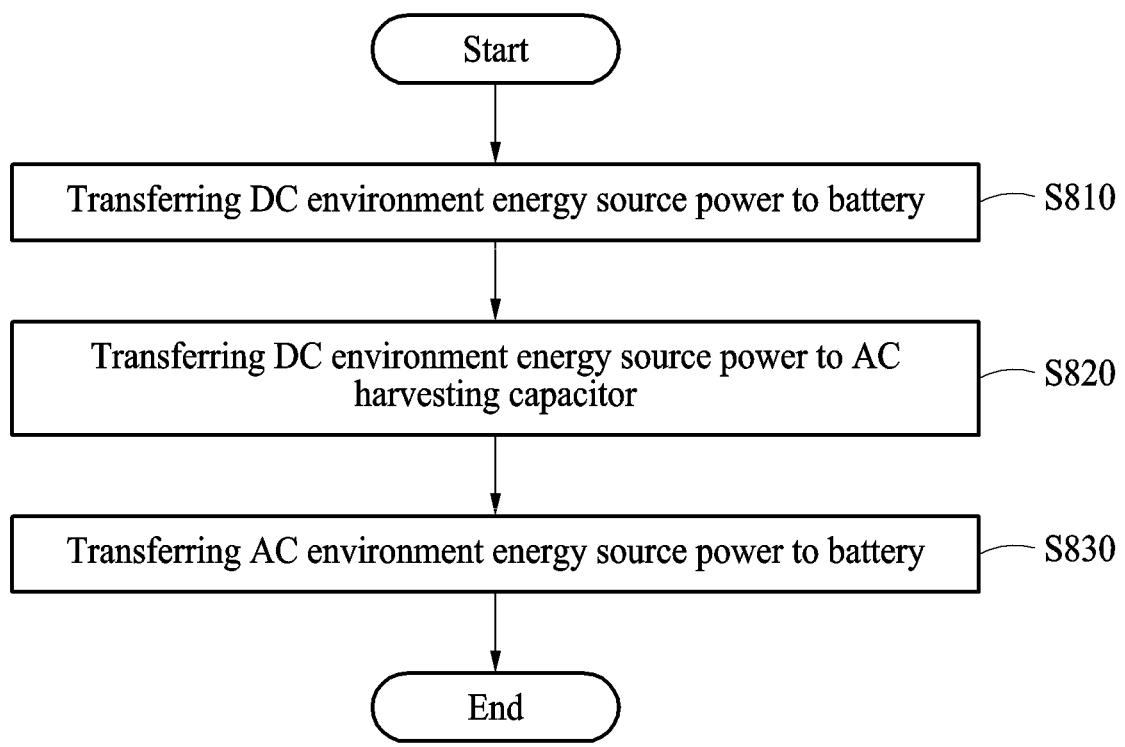
[Fig. 8]

APPARATUS FOR HARVESTING ENERGY USING DUAL ENVIRONMENT ENERGY SOURCE AND METHOD THEREOF

CROSS-REFERENCE TO RELATED APPLICATION

This application claims the priority benefit of Korean Patent Application No. 10-2017-0097840, filed on Aug. 1, 2017 in the Korean Intellectual Property Office, the disclosure of which is incorporated herein by reference.

BACKGROUND OF THE DISCLOSURE

Field of the Disclosure

The present disclosure relates to an apparatus for harvesting energy using a dual environment energy source and a method thereof, and more particularly, to an apparatus for harvesting energy using a direct current (DC) energy harvesting source and an alternating current (AC) energy harvesting source and a method thereof.

Description of the Related Art

Low-carbon green growth is one of the major policies of developed countries. To realize this, interest in low-power or non-power semiconductor designs is greatly increasing.

Energy harvesting technology is attracting attention as a very important factor in realizing a low-power or non-power semiconductor design, and the utility thereof is greatly increasing due to the development of various device technologies capable of converting energy, such as light, vibration, and heat, into electric energy. In addition, market demand for energy harvesting technology is increasing due to the emergence of various mobile devices and wireless sensor nodes.

Meanwhile, as demand for energy harvesting technology is increasing, there is an increasing need for a novel energy harvesting technology capable of collecting more energy in a more efficient manner.

RELATED ART DOCUMENTS

Patent Documents

Korean Patent Application Publication No. 10-2016-0098850, entitled "Time Managing Method of Time Sharing Type Multi Energy Harvesting Circuit"

Korean Patent Application Publication No. 10-2016-0032395, entitled "Apparatus for Harvesting Energy and Method Thereof"

U.S. Pat. No. 8,368,290, entitled "Rectifier-free Piezoelectric Energy Harvester and Battery Charger"

SUMMARY OF THE DISCLOSURE

Therefore, the present disclosure has been made in view of the above problems, and it is one object of the present disclosure to provide an apparatus for harvesting energy capable of maximizing the amount of energy extracted from an AC harvester by transferring power extracted from a DC harvester to the AC harvester to increase a peak-to-peak voltage of the AC harvester, and a method thereof.

It is another object of the present disclosure to provide an apparatus for harvesting energy capable of performing efficient harvesting by tracking electrical changes in a capacitor and an inductor and transferring power from the AC harvester to a battery at an optimal timing, and a method of thereof.

It is yet another object of the present disclosure to provide an apparatus for harvesting energy wherein a maximum power point (MPP) of the DC harvester is maintained although a voltage of the battery is changed, and a method of thereof.

In accordance with an aspect of the present invention, the above and other objects can be accomplished by the provision of an apparatus for harvesting energy including an AC harvester configured to extract power from an AC environment energy source; a DC harvester configured to extract power from a DC environment energy source; and a power transferrer configured to control a transfer path of power extracted from the DC harvester based on a magnitude of a voltage of an AC harvesting capacitor, which is an internal capacitor of the AC harvester, and a magnitude of a voltage applied from the DC harvester.

In accordance with an aspect of the present disclosure, the power transferrer may transfer the power extracted from the DC harvester to the AC harvesting capacitor when the voltage of the AC harvesting capacitor is higher than the voltage applied from the DC harvester.

In accordance with an aspect of the present disclosure, the power transferrer may transfer the power extracted from the DC harvester to a battery when the voltage of the AC harvesting capacitor is lower than the voltage applied from the DC harvester.

In accordance with an aspect of the present disclosure, the power transferrer may include a first NMOS transistor electrically connected to the AC harvesting capacitor, a second NMOS transistor electrically connected to the first NMOS transistor, and a PMOS transistor electrically connected between the first NMOS transistor and a battery, and an inductor provided on the power transfer path.

In accordance with an aspect of the present disclosure, the power transferrer may transfer a power extracted from the AC harvester to the battery at a determined timing by tracking electrical changes in the inductor and the AC harvesting capacitor when the voltage of the AC harvesting capacitor is lower than the voltage applied from the DC harvester.

In accordance with an aspect of the present disclosure, the power transferrer may transfer the power extracted from the DC harvester to the AC harvesting capacitor and, when a positive peak is detected from the voltage of the AC harvesting capacitor, turns on the first NMOS transistor during a half of a resonant period ($T_{LC}/2$) to flip the voltage of the AC harvesting capacitor.

In accordance with an aspect of the present disclosure, the power transferrer may perform the flip operation, may turn on the first NMOS transistor during a time ($T_{LC}/4$) corresponding to ¼ of a resonant period when a negative peak is detected from the voltage of the AC harvesting capacitor to perform current develop, and may turn off the first NMOS transistor and may turn on the PMOS transistor, when a current of the inductor is maximized, to transfer the power extracted from the AC harvester to the battery.

In accordance with an aspect of the present disclosure, the power transferrer may provide an oscillation signal for controlling a frequency of a driving signal of the power transferrer to the power transferrer and may include a ring oscillator including a diode-connected transistor and thus having less sensitivity to battery voltage variation.

In accordance with another aspect of the present invention, there is provided a method of harvesting energy including a step of extracting power from an AC environment energy source in an AC harvester; a step of extracting power from a DC environment energy source in a DC harvester; and a step of controlling a transfer path of the power extracted from the DC harvester based on a magnitude of a voltage of an AC harvesting capacitor, which is an internal capacitor of the AC harvester, and a magnitude of a voltage applied from the DC harvester.

In accordance with an aspect of the present disclosure, in the step of controlling a transfer path, the power extracted from the DC harvester may be transferred to the AC harvesting capacitor when the voltage of the AC harvesting capacitor is higher than the voltage applied from the DC harvester.

In accordance with an aspect of the present disclosure, in the step of controlling a transfer path, the power extracted from the DC harvester may be transferred to a battery when the voltage of the AC harvesting capacitor is lower than the voltage applied from the DC harvester.

In accordance with an aspect of the present disclosure, in the step of controlling a transfer path, a power extracted from the AC harvester may be transferred to the battery at a determined timing by tracking electrical changes in an inductor, provided on the power transfer path, and the AC harvesting capacitor when the voltage of the AC harvesting capacitor is lower than the voltage applied from the DC harvester.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a block diagram illustrating an apparatus for harvesting energy according to an embodiment of the present disclosure;

FIG. 2 illustrates timing charts according to an operation of an apparatus for harvesting energy according to an embodiment of the present disclosure;

FIG. 3A illustrates a flip operation according to an embodiment of the present disclosure;

FIG. 3B illustrates timing charts according to a flip operation according to an embodiment of the present disclosure;

FIG. 4A illustrates a current development operation according to an embodiment of the present disclosure;

FIG. 4B illustrates an operation of transferring power extracted from an AC harvester according to an embodiment of the present disclosure to a battery;

FIG. 4C illustrates timing charts according to a current development operation and an operation of transferring extracted power to a battery according to an embodiment of the present disclosure;

FIG. 5A illustrates a ring oscillator according to an embodiment of the present disclosure;

FIGS. 5B and 5C illustrate an inverter cell of the ring oscillator illustrated in FIG. 5A;

FIGS. 6A and 6B illustrate examples of generating timing for controlling a flip time interval and a current development time interval described in FIG. 2;

FIGS. 7A and 7B illustrate examples of generating timing signals for controlling a flip time interval and a current development time interval described in FIG. 2 through calibration; and FIG. 8 is a flowchart illustrating a method of harvesting energy according to an embodiment of the present disclosure.

DETAILED DESCRIPTION OF THE DISCLOSURE

The present disclosure will now be described more fully with reference to the accompanying drawings, in which exemplary embodiments of the disclosure are shown.

This disclosure, however, should not be construed as limited to the exemplary embodiments and terms used in the exemplary embodiments, and should be understood as including various modifications, equivalents, and substituents of the exemplary embodiments.

Preferred embodiments of the present disclosure are now described more fully with reference to the accompanying drawings. In the description of embodiments of the present disclosure, certain detailed explanations of related known functions or constructions are omitted when it is deemed that they may unnecessarily obscure the essence of the disclosure.

In addition, the terms used in the specification are defined in consideration of functions used in the present disclosure, and can be changed according to the intent or conventionally used methods of clients, operators, and users. Accordingly, definitions of the terms should be in the drawings, like reference numerals in the drawings denote like elements.

As used herein, the singular forms "a," "an" and "the" are intended to include the plural forms as well, unless context clearly indicates otherwise.

Expressions such as "A or B" and "at least one of A and/or B" should be understood to include all possible combinations of listed items.

Expressions such as "a first," "the first," "a second" and "the second" may qualify corresponding components irrespective of order or importance and may be only used to distinguish one component from another component without being limited to the corresponding components.

In the case in which a (e.g., first) component is referred as "(functionally or communicatively) connected" or "attached" to another (e.g., second) component, the first component may be directly connected to the second component or may be connected to the second component via another component (e.g., third component).

In the specification, the expression " . . . configured to . . . (or set to)" may be used interchangeably, for example, with expressions, such as " . . . suitable for . . . ," " . . . having ability to . . . ," " . . . modified to . . . ," " . . . manufactured to . . . ," " . . . enabling to . . . ," or " . . . designed to . . . ," in the case of hardware or software depending upon situations.

In any situation, the expression "an apparatus configured to . . . " may refer to an apparatus configured to operate "with another apparatus or component."

For examples, the expression "a processor configured (or set) to execute A, B, and C" may refer to a specific processor performing a corresponding operation (e.g., embedded processor), or a general-purpose processor (e.g., CPU or application processor) executing one or more software programs stored in a memory device to perform corresponding operations.

In addition, the expression "or" means "inclusive or" rather than "exclusive or".

That is, unless otherwise mentioned or clearly inferred from context, the expression "x uses a or b" means any one of natural inclusive permutations.

In the aforementioned embodiments, constituents of the present disclosure were expressed in a singular or plural form depending upon embodiments thereof.

However, the singular or plural expressions should be understood to be suitably selected depending upon a suggested situation for convenience of description, and the aforementioned embodiments should be understood not to be limited to the disclosed singular or plural forms. In other words, it should be understood that plural constituents may be a singular constituent or a singular constituent may be plural constituents.

While the embodiments of the present disclosure have been described, those skilled in the art will appreciate that many modifications and changes can be made to the present disclosure without departing from the spirit and essential characteristics of the present disclosure.

Therefore, it should be understood that there is no intent to limit the disclosure to the embodiments disclosed, rather, the disclosure is to cover all modifications, equivalents, and alternatives falling within the spirit and scope of the disclosure as defined by the claims.

FIG. 1 is a block diagram illustrating an apparatus for harvesting energy according to an embodiment of the present disclosure.

An energy harvesting apparatus 100 of FIG. 1 controls a transfer path of power extracted from a DC harvester 120 based on the magnitude of a voltage ($V_{AC}$) of an AC harvesting capacitor 111, which is an internal capacitor of an AC harvester 110, and the magnitude of a voltage ($V_{DC}$) applied from the DC harvester 120.

To accomplish this, the energy harvesting apparatus 100 includes the AC harvester 110, the DC harvester 120, and a power transferrer 130.

FIG. 2 illustrates timing charts according to an operation of an apparatus for harvesting energy according to an embodiment of the present disclosure.

In the timing charts of FIG. 2, reference numeral 210 denotes a voltage change in a battery, reference numeral 220 denotes a voltage change in an AC harvesting capacitor, reference numeral 230 denotes a time interval in which power extracted from a DC harvester is transferred to an AC harvesting capacitor, reference numeral 240 denotes a flip time interval during an AC harvesting operation, reference numeral 250 denotes a current development and power transfer time interval during an AC harvesting operation, and reference numeral 260 denotes a time interval in which power is transferred from a DC harvester to a battery.

Referring to FIGS. 1 and 2, the AC harvester 110 extracts power from an AC environment energy source.

For example, the AC environment energy source may be an environment energy source based on a piezoelectric device.

The DC harvester 120 extracts power from a DC environment energy source.

For example, the DC environment energy source may be an environment energy source based on a photovoltaic device or an environment energy source based on a thermoelectric generator.

The power transferrer 130 controls a transfer path of power extracted from the DC harvester 120 based on the magnitude of a voltage ($V_{AC}$) of the AC harvesting capacitor 111, which is an internal capacitor of the AC harvester 110, and the magnitude of a voltage ($V_{DC}$) applied from the DC harvester 120.

According to an embodiment, the power transferrer 130 may include a first NMOS transistor 131 electrically connected to the AC harvesting capacitor 111, a second NMOS transistor 132 electrically connected to the first NMOS transistor 131, a PMOS transistor 133 electrically connected between the first NMOS transistor 131 and a battery 140, and an inductor 134 provided on the power transfer path.

In addition, the power transferrer 130 may include a DC harvesting control transistor 135 electrically connected between the inductor 134 and the DC harvester 120.

According to an embodiment, the power transferrer 130 may transfer power extracted from the DC harvester 120 to the AC harvesting capacitor 111 when the voltage ($V_{AC}$) of the AC harvesting capacitor 111 is sufficiently higher by a predetermined level than the voltage ($V_{DC}$) applied from the DC harvester 120.

Referring to the time interval of reference numeral 230 of FIG. 2, a voltage of the AC harvesting capacitor 111 increases in a time interval in which power extracted from the DC harvester 120 is transferred to the AC harvesting capacitor 111.

Here, the power transferrer 130 may turn on the DC harvesting control transistor 135 and the first NMOS transistor 131 and may turn off the PMOS transistor 133 in the time interval of reference numeral 230 of the FIG. 2. In other words, the power transferrer 130 may perform boost conversion only in a time interval in which the voltage ($V_{AC}$) of the AC harvesting capacitor 111 is sufficiently higher by a predetermined level than the voltage ($V_{DC}$) applied from the DC harvester 120 to transfer the power extracted from the DC harvester 120 to the AC harvesting capacitor 111 for a short time not to affect a subsequent operation.

Meanwhile, the AC harvester 110 receives power extracted from the DC harvester 120 and thus a peak-to-peak voltage of the AC harvester 110 increases, whereby the amount of power extracted from the AC harvester 110 and transferred to the battery 140 may increase.

According to an embodiment, the power transferrer 130 may transfer power extracted from the DC harvester 120 to the battery 140 when the voltage ($V_{AC}$) of the AC harvesting capacitor 111 is lower than the voltage ($V_{DC}$) applied from the DC harvester 120.

In general, when the power extracted from the DC harvester 120 is transferred to the battery 140, the power may be transferred also when a voltage to be charged is lower than a voltage of a source. However, since the structure according to the present disclosure is designed so that a boost conversion operation is performed when the power extracted from the DC harvester 120 is transferred to the AC harvesting capacitor 111, the power extracted from the DC harvester 120 may be transferred to the battery 140 when $V_{AC}<V_{AC}$.

In other words, in the time interval of reference numeral 260 of FIG. 2, the power transferrer 130 may transfer the power extracted from the DC harvester 120 to the battery 140.

According to an embodiment, the power transferrer 130 may transfer power extracted from the AC harvester 110 to the battery 140 when the voltage ($V_{AC}$) of the AC harvesting capacitor 111 is lower than the voltage ($V_{DC}$) applied from the DC harvester 120.

Here, the power transferrer 130 may track an electrical change in the AC harvesting capacitor 111 and may transfer the power extracted from the AC harvester 110 to the battery 140 when a change in a peak value of the AC harvesting capacitor 111 is detected.

In other words, in the time interval of reference numeral 250 of FIG. 2, the power transferrer 130 may transfer the power extracted from the AC harvester 110 to the battery 140.

For example, the power transferrer 130 may maximize the amount of power extracted from the AC harvester 110 when the voltage ($V_{AC}$) of the AC harvesting capacitor 111 is lower than the voltage ($V_{DC}$) applied from the DC harvester 120, may determine a time interval not overlapping with the time interval, in which the power ($V_{DC}$) extracted from the DC harvester 120 is transferred to the battery 140, as the timing of an AC harvesting operation, and may transfer the power extracted from the AC harvester 110 to the battery 140 in the AC harvesting timing.

Meanwhile, an AC harvesting operation may include a flip operation, a current development operation, and an operation of transferring extracted power to a battery.

Hereinafter, the flip operation, the current development operation, and the operation of transferring extracted power to a battery are described in detail with reference to FIGS. 3A to 4C.

FIG. 3A illustrates a flip operation according to an embodiment of the present disclosure, and FIG. 3B illustrates timing charts according to a flip operation according to an embodiment of the present disclosure.

Meanwhile, a flip operation illustrated in FIG. 3A may be performed in the time interval of reference numeral 240 of FIG. 2.

FIG. 4A illustrates a current development operation according to an embodiment of the present disclosure, and FIG. 4B illustrates an operation of transferring power extracted from an AC harvester according to an embodiment of the present disclosure to a battery.

In addition, FIG. 4C illustrates timing charts according to a current development operation and an operation of transferring extracted power to a battery according to an embodiment of the present disclosure.

In FIGS. 3B and 4C, GN0 denotes a gate voltage of the second NMOS transistor 132 illustrated in FIG. 1, GP denotes a gate voltage of the PMOS transistor 133, GN1 denotes a gate voltage of the first NMOS transistor 131, and $I_L$ denotes a current flowing in the inductor 134.

The current development operation and the operation of transferring extracted power to a battery illustrated in FIGS. 4A and 4B may be performed in the time interval of reference numeral 250 of FIG. 2.

Referring to FIG. 3A to FIG. 4C, the power transferrer 130 may transfer power extracted from the DC harvester 120 to the AC harvesting capacitor 111 and may turn on the first NMOS transistor 131 during a half of a resonant period ($T_{LC}/2$) when a positive peak is detected from the voltage of the AC harvesting capacitor 111 to flip the voltage of the AC harvesting capacitor 111.

Meanwhile, the power transferrer 130 may perform a flip operation and may turn on the first NMOS transistor 131 during a time ($T_{LC}/4$) corresponding to ¼ of a resonant period when a negative peak is detected from the voltage of the AC harvesting capacitor 111 to perform current develop.

In addition, the power transferrer 130 may perform current development and may turn off the first NMOS transistor 131 and turn on the PMOS transistor 133 when a current of the inductor 134 reaches a maximum value to transfer power extracted from the AC harvester 120 to the battery 140.

Meanwhile, the flip operation, the current development operation, and the operation of transferring extracted power to a battery may be performed in an interval not overlapping with the interval in which power extracted from the DC harvester 120 is transferred to the battery 140.

Meanwhile, an apparatus for harvesting energy according to an embodiment of the present disclosure may include a ring oscillator with less sensitivity to battery voltage variation.

Here, the ring oscillator may generate a pulse for maximum power point tracking (MPPT), may generate a timing control signal for controlling an energy harvesting operation, and may output an oscillation signal for controlling driving signals of switching elements in an apparatus for harvesting energy.

Accordingly, the ring oscillator may provide an oscillation signal for controlling the frequency of a driving signal of the power transferrer 130 to the power transferrer 130.

For example, an output signal of the ring oscillator may be used to generate a driving signal input to gates of the first NMOS transistor 131 and the DC harvesting control transistor 135.

Hereinafter, the ring oscillator with less sensitivity to battery voltage is described in detail with reference to FIGS. 5A to 5C.

FIG. 5A illustrates a ring oscillator according to an embodiment of the present disclosure, and FIGS. 5B and 5C illustrate an inverter cell of the ring oscillator illustrated in FIG. 5A.

Referring to FIGS. 5A to 5C, when an inverter cell of the ring oscillator 500 is constituted as shown in FIG. 5B, a current is constant, but a voltage required for transition of an inverter also increases as a voltage of a battery increases and, accordingly, a frequency is decreased.

On the other hand, when the inverter cell of the ring oscillator 500 is constructed to include a diode-connected transistor 510 as shown in FIG. 5C, falling transition may rapidly occur due to the diode-connected transistor 510 as a voltage of a battery increases.

In this case, a drain-source voltage $V_{DS}$ and a gate-source voltage $V_{GS}$ of the diode-connected transistor 510 may increase and a falling time may be shortened.

Meanwhile, since the falling transition and the reduced falling time due to the diode-connected transistor 510 offset a rising time according to increase in a battery voltage, the ring oscillator 510 may be designed to have less sensitivity to battery voltage variation.

Accordingly, the ring oscillator 500 according to the present disclosure may be designed to include an inverter cell as shown in FIG. 5C to have less sensitivity to battery voltage.

FIGS. 6A and 6B illustrate examples of generating timing for controlling a flip time interval and a current development time interval described in FIG. 2.

A timing signal for controlling a flip time interval and a current development time interval may be generated based on a ramp voltage ($V_{RAMP}$) generated to have a constant slope through a bias current and capacitor with a constant magnitude and a reference voltage ($V_{REF}$) with a constant magnitude generated through a bias current and resistance with a constant magnitude.

For example, a flip time ($t_F$) for a flip operation may be determined by Equation 1 below:

$$t_F = \frac{1}{2f_F} = \frac{\pi}{\omega_F} = \frac{\pi}{\sqrt{\frac{1}{L_F C_P} - \left(\frac{R_L}{2L_F}\right)^2}} \quad \text{[Equation 1]}$$

wherein $t_F$ represents a flip time, $f_F$ represents a frequency for a flip operation, and $\omega F$ represents an angular speed for a flip operation.

In addition, $L_F$, $C_P$, and $R_L$ respectively represent an inductance, a capacitance and a resistance value of a resonant circuit (not shown) for timing generation.

In addition, a current development time ($t_D$) for a current development operation is a time required until a current reaches a maximum value and may be determined according to Equation 2 below:

$$t_D = \frac{t_F}{2} \quad \text{[Equation 2]}$$

wherein $t_D$ represents a current development time and $t_F$ represents a flip time.

Referring to FIGS. 6A and 6B, a current development time ($t_D$) may be determined by a pulse ($V_D$) generated at the moment at which a ramp voltage ($V_{RAMP}$) is higher than a reference voltage ($V_{REF}$).

In addition, the flip time ($t_F$) may be determined by a pulse ($V_F$) generated at the moment at which a ramp voltage ($V_{RAMP}$), a slope of which is changed to ½ times by additionally using a capacitance having the same magnitude, is higher than the reference voltage ($V_{REF}$) because the flip time ($t_F$) is twice the current development time ($t_D$) according to Equation 2.

FIGS. 7A and 7B illustrate examples of generating timing signals for controlling a flip time interval and a current development time interval described in FIG. 2 through calibration.

The configurations of a flip time ($t_F$), a current development time ($t_D$), a ramp voltage ($V_{RAMP}$), and a reference voltage ($V_{REF}$) illustrated in FIGS. 7A and 7B are the same as those described above, and thus, descriptions thereof are omitted.

Referring to FIGS. 7A and 7B, a method for calibration may be required since variations may exist in each of an inductance, a capacitance, and a resistance value of a resonance circuit (not shown) for timing generation.

The calibration for timing generation may be adjusted to develop a current to a maximum value in the current development time ($t_D$) interval.

Here, energy may be transferred to the inductor 131 and, when a voltage difference between both ends of a capacitor is 0, a maximum current may be developed.

For example, the current development time ($t_D$) and the flip time ($t_F$) may be adjusted by comparing voltages V+ and V− of both ends of the inductor 131 at a falling edge of a generated pulse ($V_D$) so as to determine the current development time ($t_D$).

Here, the current development time ($t_D$) and the flip time ($t_F$) may be adjusted by adjusting a slope of the ramp voltage ($V_{RAMP}$) to increase as denoted by reference numerals 710 and 730 when V+ is higher than V− and by adjusting the slope of $V_{RAMP}$ to decrease as denoted by reference numerals 720 and 740 when V+ is lower than V−.

FIG. 8 is a flowchart illustrating a method of harvesting energy according to an embodiment of the present disclosure.

The energy harvesting method of FIG. 8 may be performed using the energy harvesting apparatus 100 of FIG. 1.

Referring to FIG. 8, in S810, the energy harvesting apparatus 100 extracts power from an AC environment energy source in an AC harvester.

In S820, the energy harvesting apparatus 100 extracts power from a DC environment energy source in a DC harvester.

In S830, the energy harvesting apparatus 100 controls a transfer path of the power extracted from the DC harvester based on the magnitude of a voltage of an AC harvesting capacitor, which is an internal capacitor of the AC harvester, and the magnitude of a voltage applied from the DC harvester.

According to an embodiment, in S830 of controlling a transfer path of power, the energy harvesting apparatus 100 may transfer the power extracted from the DC harvester to the AC harvesting capacitor when the voltage of the AC harvesting capacitor is higher than the voltage applied from the DC harvester.

According to an embodiment, in S830 of controlling a transfer path of power, the energy harvesting apparatus 100 may transfer the power extracted from the DC harvester to a battery when the voltage of the AC harvesting capacitor is lower than the voltage applied from the DC harvester.

According to an embodiment, in S830 of controlling a transfer path of power, the energy harvesting apparatus 100 may transfer power extracted from the AC harvester to the battery at a determined timing by tracking electrical changes in the inductor, provided on the power transfer path, and the AC harvesting capacitor when the voltage of the AC harvesting capacitor is lower than the voltage applied from the DC harvester.

In accordance with the present disclosure, the amount of energy extracted from an AC harvester may be maximized by transferring power extracted from a DC harvester to the AC harvester to increase a peak-to-peak voltage of the AC harvester.

In accordance with the present disclosure, efficient harvesting may be performed by tracking electrical changes in a capacitor and an inductor and transferring power from the AC harvester to a battery at an optimal timing.

In accordance with the present disclosure, a maximum power point (MPP) of the DC harvester may be maintained although a voltage of the battery is changed.

The aforementioned apparatus may be realized by hardware component, a software component, and/or a combination of hardware and software components. For example, the apparatus and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

Software may include a computer program, code, instructions, or a combination of one or more of the foregoing, and may configure a processing device to operate as desired or independently or collectively a command to a processing device. Software and/or data may be permanently or temporarily embodied in the form of any type of machines, components, physical devices, virtual equipment, computer storage media or devices, or a signal wave to be transmitted, so as to be interpreted by a processing device or to provide a command or date to a processing device.

Software may be distributed over a networked computer system, and stored or executed in a distributed manner. Software and data may be stored on one or more computer readable media.

Embodiments of the present disclosure can include a computer readable medium including program commands for executing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

DESCRIPTION OF SYMBOLS

100: Energy harvesting apparatus
110: AC harvester
111: AC harvesting capacitor
120: DC harvester
130: Power transferrer
131: First NMOS transistor
132: Second NMOS transistor
133: PMOS transistor
134: Inductor
135: DC harvesting control transistor
140: Battery
500: Ring oscillator

What is claimed is:

1. An apparatus for harvesting energy, comprising:
an AC harvester configured to extract power from an AC environment energy source;
a DC harvester configured to extract power from a DC environment energy source; and
a power transferrer configured to control a transfer path of power extracted from the DC harvester based on a magnitude of a voltage of an AC harvesting capacitor, which is an internal capacitor of the AC harvester, and a magnitude of a voltage applied from the DC harvester,
wherein the power transferrer transfers the power extracted from the DC harvester to the AC harvesting capacitor when the voltage of the AC harvesting capacitor is higher than the voltage applied from the DC harvester.

2. The apparatus according to claim 1, wherein the power transferrer transfers the power extracted from the DC harvester to a battery when the voltage of the AC harvesting capacitor is lower than the voltage applied from the DC harvester.

3. The apparatus according to claim 1, wherein the power transferrer comprises a first NMOS transistor electrically connected to the AC harvesting capacitor, a second NMOS transistor electrically connected to the first NMOS transistor, and a PMOS transistor electrically connected between the first NMOS transistor and a battery, and an inductor provided on the power transfer path.

4. The apparatus according to claim 3, wherein the power transferrer transfers a power extracted from the AC harvester to the battery at a determined timing by tracking electrical changes in the inductor and the AC harvesting capacitor when the voltage of the AC harvesting capacitor is lower than the voltage applied from the DC harvester.

5. The apparatus according to claim 3, further comprising a ring oscillator for providing an oscillation signal for controlling a frequency of a driving signal of the power transferrer to the power transferrer, wherein the ring oscillator comprises a diode-connected transistor and thus having less sensitivity to battery voltage variation.

6. An apparatus for harvesting energy, comprising:
an AC harvester configured to extract power from an AC environment energy source;
a DC harvester configured to extract power from a DC environment energy source; and
a power transferrer configured to control a transfer path of power extracted from the DC harvester based on a magnitude of a voltage of an AC harvesting capacitor, which is an internal capacitor of the AC harvester, and a magnitude of a voltage applied from the DC harvester,
wherein the power transferrer comprises a first NMOS transistor electrically connected to the AC harvesting capacitor, a second NMOS transistor electrically connected to the first NMOS transistor, and a PMOS transistor electrically connected between the first NMOS transistor and a battery, and an inductor provided on the power transfer path,
wherein the power transferrer transfers a power extracted from the AC harvester to the battery at a determined timing by tracking electrical changes in the inductor and the AC harvesting capacitor when the voltage of the AC harvesting capacitor is lower than the voltage applied from the DC harvester, and
wherein the power transferrer transfers the power extracted from the DC harvester to the AC harvesting capacitor and, when a positive peak is detected from the voltage of the AC harvesting capacitor, turns on the first NMOS transistor during a half of a resonant period (TLC/2) to flip the voltage of the AC harvesting capacitor.

7. The apparatus according to claim 6, wherein the power transferrer performs the flip operation, turns on the first NMOS transistor during a time (TLC/4) corresponding to ¼ of a resonant period when a negative peak is detected from the voltage of the AC harvesting capacitor to perform current develop, and turns off the first NMOS transistor and turns on the PMOS transistor, when a current of the inductor is maximized, to transfer the power extracted from the AC harvester to the battery.

8. A method of harvesting energy, the method comprising:
a step of extracting power from an AC environment energy source in an AC harvester;
a step of extracting power from a DC environment energy source in a DC harvester; and
a step of controlling a transfer path of the power extracted from the DC harvester based on a magnitude of a voltage of an AC harvesting capacitor, which is an internal capacitor of the AC harvester, and a magnitude of a voltage applied from the DC harvester,
wherein, in the step of controlling a transfer path, the power extracted from the DC harvester is transferred to the AC harvesting capacitor when the voltage of the AC harvesting capacitor is higher than the voltage applied from the DC harvester.

9. The method according to claim 8, wherein, in the step of controlling a transfer path, the power extracted from the DC harvester is transferred to a battery when the voltage of the AC harvesting capacitor is lower than the voltage applied from the DC harvester.

10. The method according to claim 8, wherein, in the step of controlling a transfer path, a power extracted from the AC harvester is transferred to the battery at a determined timing by tracking electrical changes in an inductor, provided on the power transfer path, and the AC harvesting capacitor when the voltage of the AC harvesting capacitor is lower than the voltage applied from the DC harvester.

* * * * *